US010525447B2

United States Patent
Høj et al.

(10) Patent No.: US 10,525,447 B2
(45) Date of Patent: Jan. 7, 2020

(54) METHOD FOR THE PREPARATION OF A VANADIUM BASED CATALYST

(71) Applicant: Umicore AG & Co. KG, Hanau-Wolfgang (DE)

(72) Inventors: Jakob Weiland Høj, Gentofte (DK); Pär L. T. Gabrielsson, Helsingborg (SE); Claus S. Jørgensen, Virum (DK)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 16/309,343

(22) PCT Filed: Jul. 10, 2017

(86) PCT No.: PCT/EP2017/067243
§ 371 (c)(1),
(2) Date: Dec. 12, 2018

(87) PCT Pub. No.: WO2018/011132
PCT Pub. Date: Jan. 18, 2018

(65) Prior Publication Data
US 2019/0126244 A1 May 2, 2019

(30) Foreign Application Priority Data
Jul. 15, 2016 (DK) .................. 2016 00424

(51) Int. Cl.
| | | |
|---|---|---|
| *B01J 23/22* | (2006.01) | |
| *B01J 37/04* | (2006.01) | |
| *B01J 37/08* | (2006.01) | |
| *B01J 21/06* | (2006.01) | |
| *B01J 23/00* | (2006.01) | |
| *B01J 23/30* | (2006.01) | |
| *B01J 35/00* | (2006.01) | |
| *B01J 35/02* | (2006.01) | |
| *B01J 35/04* | (2006.01) | |
| *B01J 35/10* | (2006.01) | |
| *B01J 37/00* | (2006.01) | |
| *B01J 35/06* | (2006.01) | |
| *B01J 37/02* | (2006.01) | |

(52) U.S. Cl.
CPC ............. *B01J 23/22* (2013.01); *B01J 21/063* (2013.01); *B01J 23/002* (2013.01); *B01J 23/30* (2013.01); *B01J 35/006* (2013.01); *B01J 35/023* (2013.01); *B01J 35/04* (2013.01); *B01J 35/06* (2013.01); *B01J 35/1014* (2013.01); *B01J 37/0009* (2013.01); *B01J 37/0036* (2013.01); *B01J 37/0225* (2013.01); *B01J 37/04* (2013.01); *B01J 37/08* (2013.01)

(58) Field of Classification Search
CPC ........ B01J 23/22; B01J 21/063; B01J 23/002; B01J 23/30; B01J 35/006; B01J 35/023; B01J 35/04; B01J 35/06; B01J 35/1014; B01J 37/0036; B01J 37/0225; B01J 37/04; B01J 37/08
See application file for complete search history.

(56) References Cited

U.S. PATENT DOCUMENTS

| | | | |
|---|---|---|---|
| 2014/0050627 A1* | 2/2014 | Mende | ................ B01D 53/944 422/171 |
| 2014/0105803 A1 | 4/2014 | Hong et al. | |

FOREIGN PATENT DOCUMENTS

| | | | |
|---|---|---|---|
| CN | 103736482 A | * | 4/2014 |
| DE | 3826137 A1 | | 2/1990 |
| EP | 2878367 A1 | | 6/2015 |

OTHER PUBLICATIONS

International Search Report received in PCT/EP2017/067243 dated Oct. 11, 2017.
Written Opinion received in PCT/EP2017/067243 dated Oct. 11, 2017.

* cited by examiner

*Primary Examiner* — James A Fiorito
(74) *Attorney, Agent, or Firm* — Suzannah K. Sundby, Esq.; Canady + Lortz LLP

(57) ABSTRACT

Method for the preparation of a catalyst comprising vanadium pentoxide supported on a metal oxide catalyst carrier comprising the steps of a) providing particles of crystalline vanadium pentoxide and particles of a metal oxide catalyst carrier; b) solid state mixing the particles and dispersing the vanadium pentoxide particles on surface of the metal oxide carrier particles; and c) anchoring the dispersed vanadium pentoxide particles on surface of the metal oxide carrier particles by calcination at a temperature above 500° C., characterized in that sintering of the vanadium pentoxide particles is suppressed by addition of an anti-sintering metal oxide component, such as tungsten trioxide, during the anchoring in step c).

14 Claims, No Drawings

METHOD FOR THE PREPARATION OF A VANADIUM BASED CATALYST

The present invention relates to the preparation of vanadium based catalyst. In particular, the invention is based on a solid state process for the preparation of vanadium pentoxide supported on a metal oxide catalyst carrier.

The conventional method used to produce a vanadium based catalysts comprises liquid impregnation of a catalyst carrier such as titanium oxide with ammonium meta vanadate or vanadyl oxalate dissolved in water followed by calcination of the impregnated carrier to form vanadium pentoxide as layer on the carrier surface.

A further method of introducing the vanadium pentoxide on or into a metal oxide carrier is carried out by means of solid state process. This method is simpler as pretreatment of the carrier and the active phase can be avoided when mixing fine vanadium pentoxide powder with the catalyst carrier metal oxide. Since vanadium pentoxide is rather mobile, it will disperse substantially homogeneous on surface of the carrier material and perform a solid state impregnation of the carrier material when heated to temperature above 500° C. A disadvantage of the solid state process is the high temperature necessary to anchor vanadium pentoxide to the catalyst carrier metal oxide. Sintering of the vanadium pentoxide particles causes a change in the grain size, and the grain size of V2O5 increases with increasing the sintering temperature.

This invention provides a solid state method for the preparation of a catalyst comprising vanadium pentoxide supported on a metal oxide catalyst carrier with reduced sintering by addition of an anti-sintering agent during anchoring of the vanadium pentoxide particles to the carrier.

The term "solid state method" or "solid state process" as used hereinbefore and in the following shall be understood in context with present invention that the process or method of coating or impregnating a catalyst carrier material with vanadium pentoxide is carried out in the dry state by thermal spreading and anchoring without use of a liquid or solvent.

Thus, this invention provides a method for the preparation of a catalyst comprising vanadium pentoxide supported on a metal oxide catalyst carrier comprising the steps of
   a) providing particles of crystalline vanadium pentoxide and particles of a metal oxide catalyst carrier;
   b) solid state mixing the particles and dispersing the vanadium pentoxide particles on surface of the metal oxide carrier particles; and
   c) anchoring the dispersed vanadium pentoxide particles on surface of the metal oxide carrier particles by calcination at a temperature above 500° C., characterized in that sintering of the vanadium pentoxide particles is suppressed by addition of an anti-sintering metal oxide component during the anchoring in step c).

The particle size of the vanadium pentoxide particles is preferably between 0.5 and 10 µm, preferably between 2 and 5 µm, to obtain effective distribution and mixing of the carrier particles and the vanadium pentoxide particles.

The thus prepared mixture is heated to a temperature of above 500° C., preferably between 550 to 650° C., whereby the vanadium pentoxide particles are effectively dispersed and anchored on surface of the carrier material.

In a specific embodiment, the carrier metal oxide is titania.

Vanadium pentoxide catalysts supported on titania show a very high efficiency in the selective catalytic reduction of nitrogen oxides. The supported V2O5/TiO2 catalysts possess high oxidation activity and are useful for the removal of hydrocarbons, in particular halogenated hydrocarbons like dioxins from power plant and waste incineration plant emissions.

To prevent sintering of the catalyst carrier particles, it is preferred to stabilize the metal oxide carrier with tungsten oxide and/or silica.

In stationary applications, the vanadium pentoxide catalyst prepared by the method according to the invention can be used in particle form in fixed bed manner.

In automotive applications, the catalyst will typically be applied on a monolithic substrate. For these applications, the metal oxide supported vanadium pentoxide catalyst can be coated on the substrate by use of a washcoat containing the catalyst.

When preparing a washcoat, the prepared supported vanadium pentoxide catalyst is milled or agglomerated to a required particle size and suspended in an organic solvent, optionally with addition of binders, viscosity improvers, foaming agents or other processing aids as known in the art.

The thus prepared washcoat is coated on a monolithic substrate in known manner. The coated monolithic substrate is subsequently calcined in an inert atmosphere followed by a calcination sequence in air.

The monolithic substrate can consists of corrugated non-woven fibers, preferably comprising glass fibers.

In a further embodiment, the monolithic substrate consists of ceramic extrudates, preferably extrudates of cordierite or silicon carbide.

A further application of the supported vanadium pentoxide catalyst prepared by a method according to the invention is in the manufacture of a full body catalyst by preparing a paste and extruding the past into the full body monolithic catalyst.

EXAMPLE 2 parts of V2O5 were mixed thoroughly with 98 parts of either pure TiO2 (mixture 1) or TiO2 modified with 10% WO3 (mixture 2) by dry milling with ZrO2 beads. Each of the physical mixtures was calcined in static air for 4 h at 575° C.

After calcination the surface area of mixture 1 is 48.2 $m^2/g$ and of mixture 2 61.3 $m^2/g$.

The invention claimed is:

1. A solid state method for the preparation of a catalyst comprising vanadium pentoxide supported on a metal oxide catalyst carrier comprising the steps of
   a) providing particles of crystalline vanadium pentoxide and particles of a metal oxide catalyst carrier;
   b) solid state mixing the particles and dispersing the vanadium pentoxide particles on surface of the metal oxide carrier particles without the use of a liquid or a solvent; and
   c) anchoring the dispersed vanadium pentoxide particles on surface of the metal oxide carrier particles by calcination at a temperature above 500° C. and without the use of a liquid or a solvent, wherein sintering of the vanadium pentoxide particles is suppressed by addition of an anti-sintering metal oxide component during the anchoring in step c).

2. The solid state method of claim 1, wherein the particle size of the crystalline vanadium pentoxide is between 0.5 and 10 µm.

3. The solid state method of claim 2, wherein the particle size is between 2 and 5 µm.

4. The solid state method according to claim 1, wherein the metal oxide catalyst carrier comprises titania.

5. The solid state method according to claim 1, wherein the anti-sintering metal oxide component comprises tungsten oxide or silica and mixtures thereof.

6. The solid state method according to claim 1, comprising the further step of preparing a washcoat by suspending the calcined particles obtained in step c) in an organic solvent.

7. The solid state method of claim 6, wherein the washcoat contains one or more dispersions agents.

8. The solid state method of claim 6, wherein the washcoat contains one or more binders selected from the group consisting of alumina, silica and titania.

9. The solid state method of claim 6, comprising the further step of applying the washcoat on a monolithic substrate.

10. The solid state method of claim 9, wherein the monolithic substrate comprises one or more corrugated sheets of non-woven fibers.

11. The solid state method of claim 10, wherein the one or more corrugated sheets of non-woven fibers comprise glass fibers.

12. The solid state method of claim 9, wherein the monolithic substrate is a ceramic extrudate.

13. The solid state method of claim 12, wherein the ceramic extrudate consists of cordierite or silicon carbide.

14. The solid state method of claim 1, comprising the further steps of preparing a paste comprising the calcined particles and extruding the paste to a full body catalyst monolith.

* * * * *